O. Stoddard.
Harvester Cutter.
No. 20301
Patented May. 11. 1858.
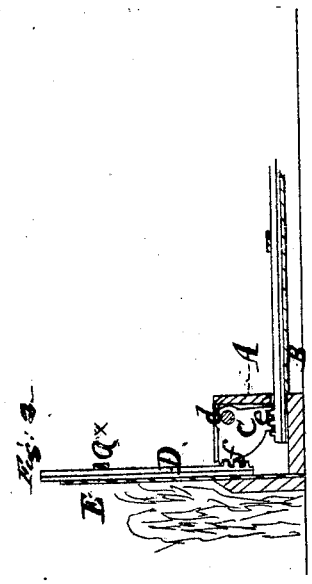
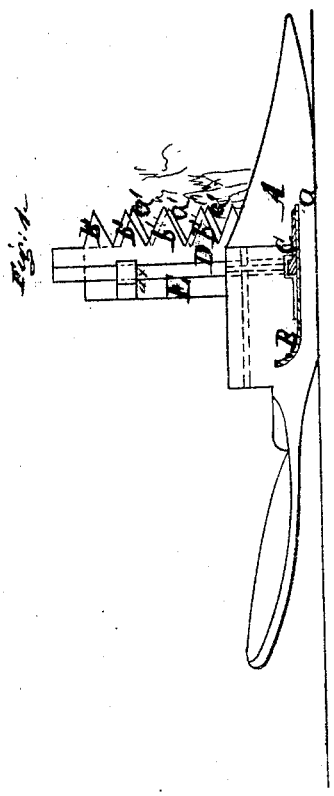
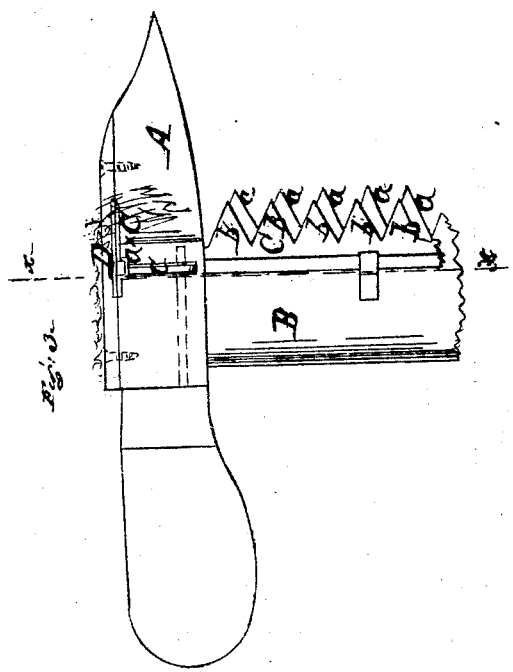

UNITED STATES PATENT OFFICE.

O. STODDARD, OF BUSTI, NEW YORK.

IMPROVEMENT IN HARVESTERS.

Specification forming part of Letters Patent No. 20,221, dated May 11, 1858.

*To all whom it may concern:*

Be it known that I, OREN STODDARD, of Busti, in the county of Chautauqua and State of New York, have invented a new and useful Improvement in Harvesters; and I do hereby declare that the following is a full, clear, and exact description of the same, reference being had to the annexed drawings, making a part of this specification, in which—

Figure 1 is a transverse section of a cutting device, showing the shoe at the outer end of the finger-bar, and also my improvement. Fig. 2 is a longitudinal section of the same, taken in the line $x\,x$, Fig. 3. Fig. 3 is a plan or top view of the same.

Similar letters of reference indicate corresponding parts in the several figures.

This invention consists in the employment or use of a supplementary sickle or cutting device attached to the shoe at the outer end of the cutter-bar, and so arranged as to be operated from any of the usual reciprocating sickles, and at the same time allowed to cut vertically or at right angles with the sickle proper, as hereinafter fully shown and described.

The object of the invention is to cause the cut grain or grass to be perfectly divided from the standing grass or grain, so that a clean, close, and even swath will be cut and a free path or tread obtained for the team when the implement is cutting the succeeding swath.

To enable those skilled in the art to fully understand and construct my invention, I will proceed to describe it.

A represents a shoe, to which the outer end of a cutter-bar, B, is attached. This bar B is constructed of metal, the front part having a series of saw-shaped teeth, $a$, similar to the generality of those ordinarily used.

C is a sickle, which has the same form of teeth $b$ as the bar B. This sickle has a reciprocating motion given it by any proper means, its teeth $b$ working over the teeth $a$, the latter of course being stationary.

Within the shoe A a toothed quadrant, $c$, is placed, said quadrant working on a pin, $d$. The quadrant is placed transversely in the shoe, and its lower end gears into the sickle C, as shown clearly at $e$ in Fig. 2. The upper end of the quadrant gears into the lower end of a short vertical sickle, D, as shown at $f$, which sickle is constructed precisely similar to the sickle C, the sickle D being provided with teeth $b'$, and fitted by means of a guide, $a^\times$, to a vertical toothed bar, E, which corresponds to the toothed bar B of sickle C. The toothed quadrant $c$ serves to transmit motion from the sickle to the sickle D. The sickle D is quite short compared with the sickle C, and the former, as the machine is drawn along, cuts all lodged grass or grain and perfectly divides the cut from the standing grain or grass, so that an unobstructed tread or path will be formed for the team as the succeeding cut or swath is made.

This device is more especially designed for mowing-machines or grass-harvesters, as grass often becomes "lodged" or bent down, so that it is cut by the ordinary machines with considerable difficulty, and it cannot when lodged be cut with the ordinary machines clean at the margin of the standing grass, and consequently an imperfect swath is obtained.

My improvement may be applied to implements at a small expense. It does not render a machine complex, nor liable to get out of repair.

Having thus described my invention, what I claim as new, and desire to secure by Letters Patent, is—

The supplementary sickle D, connected with the sickle proper, C, and placed relatively with the sickle C so as to operate as and for the purpose set forth.

OREN STODDARD.

Witnesses:
ABRAM FRANK,
WILLIAM HICKS.